United States Patent [19]

Funae et al.

[11] Patent Number: 5,411,798
[45] Date of Patent: May 2, 1995

[54] MAGNETIC RECORDING SHEET COMPRISING A GEL BINDER

[75] Inventors: Haruyoshi Funae; Shigetoshi Hiraishi, both of Tokyo, Japan

[73] Assignee: Mitsubishi Paper Mills Limited, Tokyo, Japan

[21] Appl. No.: 721,334

[22] Filed: Jul. 1, 1991

[30] Foreign Application Priority Data

Jul. 2, 1990 [JP] Japan .................. 2-174691
Jul. 17, 1990 [JP] Japan .................. 2-190189

[51] Int. Cl.$^6$ .................. G11B 5/66; B32B 27/08
[52] U.S. Cl. .................. 428/341; 428/694 B; 428/900; 503/200; 503/208; 503/213; 503/226
[58] Field of Search .................. 428/694, 900, 694 B, 428/341, 342; 503/208, 213, 200, 226

[56] References Cited

U.S. PATENT DOCUMENTS

| | | | |
|---|---|---|---|
| 4,020,227 | 4/1976 | Deffeyes | 428/306 |
| 4,469,624 | 9/1984 | Ueda et al. | 252/513 |
| 4,551,738 | 11/1985 | Maruta et al. | 503/200 |
| 4,663,209 | 5/1987 | Aonuma et al. | 428/141 |
| 4,686,149 | 8/1987 | Aonuma et al. | 428/522 |
| 4,824,824 | 4/1989 | Matsushita et al. | 503/204 |
| 4,855,282 | 8/1989 | Satomura et al. | 503/218 |
| 4,939,060 | 7/1990 | Tomiyama et al. | 430/106.6 |
| 5,036,039 | 7/1991 | Sekine et al. | 503/217 |
| 5,091,357 | 2/1992 | Kosaka | 503/207 |
| 5,106,814 | 4/1992 | Hiraishi et al. | 503/208 |
| 5,147,768 | 9/1992 | Sakakibara | 430/501 |
| 5,171,730 | 12/1992 | Morita et al. | 503/207 |
| 5,180,649 | 1/1993 | Kukimoto et al. | 430/106.6 |

FOREIGN PATENT DOCUMENTS

| | | |
|---|---|---|
| 2221493 | 5/1971 | Germany . |
| 5856891 | 9/1981 | Japan . |
| 58-38733 | 3/1983 | Japan . |
| 58-54085 | 3/1983 | Japan . |
| 58-104959 | 6/1983 | Japan . |
| 1388862 | 3/1975 | United Kingdom . |

*Primary Examiner*—D. S. Nakarani
*Assistant Examiner*—H. Thi Lê
*Attorney, Agent, or Firm*—Cushman Darby & Cushman

[57] ABSTRACT

The present invention provides a magnetic recording sheet which is excellent in its production operability, magnetic recording characteristics and visible information recording characteristics. The magnetic recording sheet comprises a substrate, a magnetic recording layer which comprises a binder having a gel content of 5–75% and ferromagnetic powders and is provided on one side of the substrate, and a visible information recording layer which comprises at least one binder selected from the group consisting of a synthetic binder and a natural binder is and provided on another side of the substrate. The present invention further provides a heat-sensitive magnetic recording sheet which is excellent in whiteness of the heat-sensitive recording layer and image stability and which comprises a substrate, a magnetic recording layer comprising a binder and ferromagnetic powders and provided on one side of the substrate, and a heat-sensitive recording layer comprising an aromatic isocyanate compound, an imino compound and a binder and containing a heat meltable substance having a melting point of 60°–180° C. and provided on another side of the substrate.

11 Claims, No Drawings

MAGNETIC RECORDING SHEET COMPRISING A GEL BINDER

BACKGROUND OF THE INVENTION

The present invention relates to a magnetic recording sheet useful as passenger tickets, coupon tickets, commuter pass, prepaid cards and the like and more particularly, to a magnetic recording sheet free from problems in production step and excellent in magnetic characteristics and visible information printing characteristics. The present invention further relates to a heat-sensitive type magnetic recording sheet, especially magnetic ticket sheet which is excellent in image storage stability of heat-sensitive recording layer and in magnetic characteristics of magnetic recording layer.

Hitherto, since the magnetic recording surface of a magnetic recording sheet has brown or dark black color due to the color tone of magnetic coating composition coated thereon, the desired visible information recording is carried out by providing on the opposite side a heat-sensitive recording layer, a heat transfer receiving layer, an ink jet receiving layer, a printing ink receiving layer, a dot printer receiving layer, an electrostatic recording receiving layer, an electrophotographic receiving layer or the like. Further, for protecting the magnetic recording layer, a coating layer mainly composed of an aqueous or solvent type binder is provided on the magnetic recording layer. Moreover, for protecting unprinted portion and printed portion, a coating layer mainly composed of an aqueous binder is provided on the heat sensitive recording layer.

However, when a magnetic recording layer or a magnetic layer and a protective layer are provided on one side of fibrous substrate such as paper or nonwoven fabric and a visible information recording layer or a visible information recording layer and a protective layer are provided on another side, the solvent such as water which has penetrated into the substrate cannot go out therefrom and expands due to the heat at drying, resulting in dry creases or rough coating surface.

SUMMARY OF THE INVENTION

An object of the present invention is to improve magnetic characteristics and visible information recording characteristics of magnetic recording sheet by avoiding troubles in production of the magnetic recording sheet and inhibiting formation of nonuniform coating surface.

Another object of the present invention is to improve image storage stability of the heat-sensitive recording layer.

As a result of intensive research conducted by the inventors in an attempt to solve these problems, it has been found that the above problems can be solved by providing on one side of a substrate a magnetic recording layer mainly composed of a binder having a gel content of 5-75% and ferromagnetic powders and, if necessary, a protective layer provided on the magnetic recording layer and on another side a visible information recording layer containing a synthetic binder and-/or a natural binder and, if necessary, a protective layer provided on the visible information recording layer. Thus, the present invention has been accomplished.

DESCRIPTION OF THE INVENTION

When content of gel in the binder of the magnetic recording layer is more than 75%, creasing occurs much upon drying and the coating surface is considerably roughened. When it is less than 5%, coated layer strength is low and troubles are liable to occur in production and processing steps.

The gel content in the binder here is determined by the following method. That is, a binder is allowed to dry and film at room temperature, and this film is put into benzene of which amount is about 200 times the volume of the film and is left to stand for 48 hours and dissolved in it. The solution is filtered by a filter paper (#2). Then, the filtrate is dried at 70° C. and its weight (sol of the binder) is measured; amount of gel of the binder is calculated therefrom.

The magnetic recording layer in the present invention is formed by uniformly dispersing magnetic powders in a binder having a gel content of 5-75% such as styrene.butadiene copolymer resin, polyacrylic acid ester resin, polyester resin, polyurethane resin, vinyl chloride-vinyl acetate copolymer resin, epoxy resin, or the like, to which a plasticizer, a rubber, a dispersing agent, an antistatic agent, a pigment and the like are added depending on the objective. The resulting coating composition is applied on a substrate by coating or printing. Coating wt. of the layer is generally 10-50 g/m² as dry magnetic powders.

The magnetic powders include, for example, $\gamma$—$Fe_2O_3$, $Fe_3O_4$, a mixed crystal of $\gamma$—$Fe_2O_3$ and $Fe_3O_4$, Co-containing $\gamma$—$Fe_2O_3$, Co-containing $Fe_3O_4$, Ba-ferrite, and Sr-ferrite. In order to prevent erasure of magnetic-recorded information by an ordinary permanent magnet, Ba-ferrite, Sr-ferrite, or the like having a coercive of 1500-5000 oersteds are used. A protective layer of nitrocellulose, polyurethane resin, polyvinyl alcohol or the like can further be coated or printed on the magnetic recording layer. Gel content in this protective layer is preferably 5-75%.

As the visible information recording layer in the present invention, mention may be made of, for example, a heat-sensitive recording layer, a heat transfer receiving layer, an ink jet receiving layer, a printing ink receiving layer, a dot printer receiving layer, an electrostatic recording receiving layer, and an electrophotographic receiving layer.

Among them, the heat-sensitive recording layer and the heat transfer receiving layer are prevalent at present but the ink jet receiving layer and the printing ink receiving layer may also be employed.

The heat-sensitive recording layer comprises a colorless or light colored dye precursor and an acidic substance as color forming components and forms a color upon heating.

Examples of the dye precursors are as follows.
(1) crystal violet lactone
(2) 3-Indolino-3-p-dimethylaminophenyl-6-dimethylaminophthalide
(3) 3-Diethylamino-7-chlorofluoran
(4) 3-Diethylamino-7-cyclohexylaminofluoran
(5) 3-Diethylamino-5-methyl-7-t-butylfluoran
(6) 3-Diethylamino-6-methyl-7-anilinofluoran
(7) 3-Diethylamino-6-methyl-7-p-butylanilinofluoran
(8) 2-(N-phenyl-N-ethyl)aminofluoran
(9) 3-Diethylamino-7-dibenzylaminofluoran
(10) 3-Cyclohexylamino-6-chlorofluoran
(11) 3-Diethylamino-6-methyl-7-xylidinofluoran
(12) 2-Anilino-3-methyl-6-(N-ethyl-p-toluidino)fluoran
(13) 3-Pyrrolidino-6-methyl-7-anilinofluoran
(14) 3-Pyrrolidino-7-cyclohexylaminofluoran
(15) 3-Piperidino-6-methyl-7-toluidinofluoran

(16) 3-Piperidino-6-methyl-7-anilinofluoran
(17) 3-(N-methylcyclohexylamino)-6-methyl-7-anilinofluoran
(18) 3-Diethylamino-7-(m-trifluoromethylanilino)fluoran
(19) 3-Diethylamino-6-methyl-7-chlorofluoran
(20) 3-Dibutylamino-6-methyl-7-anilinofluoran Examples of the acidic substances used in the heat-sensitive recording layer are shown below.
(1) 4,4'-Isopropylidenediphenol
(2) 4,4'-Isopropylidenebis(2-chlorophenol)
(3) 4,4'-Isopropylidenebis(2-tert-butylphenol)
(4) 4,4'-sec-Butylidenediphenol
(5) 4,4'-(1-Methyl-n-hexylidene)diphenol
(6) 4-Phenylphenol
(7) 4-Hydroxydiphenoxide
(8) Methyl-4-hydroxybenzoate
(9) Phenyl-4-hydroxybenzoate
(10) 4-Hydroxyacetophenone
(11) Salicylic acid anilide
(12) 4,4'-Cyclohexylidenediphenol
(13) 4,4'-Cyclohexylidenebis(2-methylphenol)
(14) 4,4'-Benzylidenediphenol
(15) 4,4'-Thiobis(6-tert-butyl-3-methylphenol)
(16) 4,4'-Isopropylidenebis(2-methylphenol)
(17) 4,4'-Ethylenebis(2-methylphenol)
(18) 4,4'-Cyclohexylidenebis(2-isopropylphenol)
(19) 2,2'-Dihydroxydiphenyl
(20) 2,2'-Methylenebis(4-chlorophenol)
(21) 2,2'-Methylenebis(4-methyl-6-t-butylphenol)
(22) 1,1'-Bis(4-hydroxyphenol)cyclohexane
(23) 2,2'-Bis(4'-hydroxyphenyl)propane
(24) Novolak type phenolic resin
(25) Halogenated novolak type phenolic resin
(26) α-Naphthol
(27) β-Naphthol
(28) 3,5-Di-t-butylsalicylic acid
(29) 3,5-Di-α-methylbenzylsalicylic acid
(30) 3-Methyl-5-t-butylsalicylic acid
(31) Phthalic acid monoanilide p-ethoxybenzoic acid
(32) Bis (4-hydroxyphenyl)sulfone
(33) 4-Hydroxy-4'-isopropyloxydiphenylsulfone
(34) Di-(3-allyl-4-hydroxyphenyl)sulfone
(35) p-Benzyloxybenzoic acid
(36) Benzyl p-hydroxybenzoate The coating composition for heat-sensitive recording layer in the present invention can be obtained by the following process. That is, the acidic substance and the dye precursor which reacts with the acidic substance to form a color are separately or simultaneously ground into fine particles and dispersed, then the dispersion is mixed with a binder, a pigment and the like and furthermore, if necessary, various additives are added thereto and thus, the coating composition is prepared.

As the binder, there may be used, for example, water-soluble binders such as starches, hydroxyethyl cellulose, methyl cellulose, polyvinyl alcohol, modified polyvinyl alcohol, styrenemoleic anhydride copolymer, ethylene-maleic anhydride copolymer, styrene-butadiene copolymer, polyacrylamide, carboxymethyl cellulose, methylethyl cellulose, gum arabic, gelatin, and casein, and latexes such as styrene-butadiene latex, acrylonitrile-butadiene latex, and methyl acrylate-butadiene latex.

As the pigment, there may be used, for example, diatomaceous earth, talc, kaolin, calcined kaolin, calcium carbonate, magnesium carbonate, titanium oxide, zinc oxide, silicon oxide, aluminum hydroxide, and urea-formalin resin.

In addition, there may also be used higher fatty acid metallic salts such as zinc stearate and calcium stearate, waxes such as paraffin, paraffin oxide, polyethylene, polyethylene oxide, stearic acid amide, and castor wax, wetting agents such as dioctyl sulfosuccinate, ultraviolet absorbers such as benzophenones and benzotriazoles, and surface active agents and fluorescent dyes.

When a protective layer is provided on the heat-sensitive recording layer, a hydrophilic resin is preferred for inhibiting color formation with the dye precursor. Examples of the hydrophilic resin are polyvinyl alcohol, polyvinyl pyrrolidone. polyacrylamide, carboxymethyl cellulose, hydroxethyl cellulose, and modified products thereof.

As the substrate, there may be used paper, nonwoven fabrics, woven fabrics, and besides synthetic papers, laminated papers, plastic films, and metallic foils may be used singly or in combination.

The present invention can also be applied to the systems as disclosed in Japanese Patent Kokai Nos. 58-38733, 58-54085, and 58-104959 which are excellent in color erosion resistance of images because a stable compound is produced by thermal reaction of an imino compound and an isocyanate compound in the heat-sensitive recording layer. The present invention can also be applied to the chelate type system which utilizes the heating reaction of ferric stearate with tannic acid or gallic acid and the diazo type heat-sensitive sheets which utilize the reaction of a diazonium salt with a coupler. As the pigment and the binder, there may be used those which are the same as used for the heat-sensitive recording layer which utilizes the dye precursor and the acidic substance.

The heat transfer receiving layer is required to have the characteristics of excellent transferability of heat transfer ink and of easy absorption of heat transfer ink thereto.

Main components of the heat transfer receiving layer are pigment and binder. As the pigment, those used for coated papers can be used, but preferred are those having an oil absorption (according to JIS-K5101) of 30–200 ml/100 g. Examples of the pigments are inorganic pigments such as natural or synthetic zeolites, kaolin, talc, agalmatolite, diatomaceous earth, synthetic silica, clay, calcined kaolin, calcium carbonate, magnesium silicate, titanium oxide, barium carbonate, and aluminum hydroxide and organic pigments such as urea-formalin filler. Examples of the binders are styrene-butadiene latex, ethylene-vinyl acetate latex, acrylic latex, hydroxyethyl cellulose, carboxymethyl cellulose, casein, polyvinyl alcohol, and starch.

Other additives include, for example, pigment dispersing agent, defoamer, lubricant, dye, fluorescent brightner, ultraviolet absorber, water-proofing agent, and preservative.

Coating amount of the heat transfer receiving layer is preferably 3–30 g/m$^2$. If it is less than 3 g/m$^2$, ink transferability is inferior and if it is more than 30 g/m$^2$, cost becomes high and furthermore since evaporation amount of water or solvent increases, coating and drying efficiency lowers.

The ink jet recording method comprises forming fine ink droplets by various principles and putting them onto a receiving surface such as paper to produce recorded images, in order to improve reproducibility of dot diameter, shape, image density and color tone, and ink jet receiving layer is provided on a support such as a paper. The ink jet receiving layer contains pigment and binder as main components. The pigment and the binder may be the same as those used for heat transfer receiving layer. Coating amount of the ink jet receiving layer is preferably 2-30 g/m². If it is less than 2 g/m², ink receptivity and dot reproducibility are inferior and if it is more than 30 g/m², cost increases and besides, coating and drying efficiency deteriorates.

The printing ink receiving layer comprises pigment, binder, dispersing agent, deformer and the like which are ordinarily used for art papers and coated papers. Specifically, kaolin, clay, talc, calcium carbonate, silica and the like are used as pigments, and as binders there may be used synthetic binders such as styrene-butadiene latex, acrylic latex, and polyvinyl alcohol resin latex and natural binders such as starch, casein and cellulose derivatives.

Coating amount of the printing ink receiving layer is about 1-20 g/m² and is generally 3-13 g/m².

When the heat-sensitive recording layer is formed as usual by coating a coating composition comprising a leuco dye, an acidic substance and a binder, the heat-sensitive recording layer develops color with an organic solvent such as toluene and methyl ethyl ketone and besides, storage stability of records is of problem; for example, the colored portions (i.e. records) disappear due to contact with a plasticizer, such as dioctyl phthalate (DOP) and dioctyl adipate (DOA) contained in plastics, or with chemicals contained in foods or cosmetics; records fade easily when exposed to direct sunlight even for a short time. These defects are critical for some uses, especially when the recording layer is applied to tickets or prepaid cards where visible records are vital, providing strong motivation for the production of a recording material less subject to these defects.

Furthermore, for heat-sensitive recording type magnetic ticket sheets, organic solvent type coating compositions are used in many cases to improve characteristics of the magnetic recording layer and the heat-sensitive recording layer often develops color upon contact with the solvents such as toluene and methyl ethyl ketone.

As already referred to hereinabove, in addition to the heat-sensitive recording materials in which leuco dyes are used, a heat-sensitive recording material comprising an imino compound and isocyanate compound is disclosed in Japanese Patent Kokai Nos. 58-38733, 58-54085, and 58-104959, in which two components react upon heating to produce recorded images of high storage stability. However, a material of this kind is poor in heat response and it has been difficult with it to obtain records of sufficient image density by high-speed printing devices. It has been further found that when the coating composition for the magnetic recording layer contains organic solvent, the heat response of that kind of recording layer further deteriorates.

Therefore, as already mentioned heretofore, the further object of the present invention is to provide a heat-sensitive recording type magnetic recording sheet which is excellent in heat response of the heat sensitive recording layer, has unrecorded portion of nearly white and is improved in storage stability of formed color images.

As a result of intensive research to attain the above additional object, it has been found that when the heat-sensitive recording layer comprises mainly an aromatic isocyanate compound, an imino compound and a binder and additionally contains a heat-meltable substance having a melting point of 60°-180° C., a heat-sensitive recording type magnetic sheet excellent in heat-sensitive recording characteristics can be obtained.

Especially a remarkable effect has been obtained in improvement of the problem of color formation of unrecorded portion in heat-sensitive recording layer when the magnetic recording layer is formed using organic solvents such as toluene and methyl ethyl ketone.

Furthermore, especially when gel content in the binder of the magnetic recording layer is 5-75%, characteristics of the heat-sensitive layer and magnetic layer are further improved. It is considered that this is because when after coating of the magnetic layer, amounts of remaining solvent and water are reduced after drying and when the heat-sensitive recording layer and the protective layer are coated and are dried, water and solvents are smoothly evaporated and hence, adverse effects thereof on characteristics of the heat-sensitive layer and the magnetic layer can be inhibited. Drying of the heat-sensitive recording layer is carried out at a low temperature for a long time in order to inhibit heat-fogging and the adverse effects are liable to occur.

The aromatic isocyanate compounds used in the present invention are colorless or light colored aromatic isocyanate compounds or heterocyclic compounds which are solid at room temperature and for example, at least one of the following isocyanate compounds are used.

2-6-Dichlorophenyl isocyanate, p-chlorophenyl isocyanate, 1,3-phenylene diisocyanate, 1,4-phenylene diisocyanate, 1,3-dimethylbenzene-4,6-diisocyanate, 1,4-dimethylbenzene-2,5-diisocyanate, 1-methoxybenzene-2,4-diisocyanate, 1-methoxybenzene 2,5-diisocyanate, 1-ethoxybenzene-2,4-diisocyanate, 2,5-dimethoxybenzene-1,4-diisocyanate, 2,5-diethoxybenzene-1,4-diisocyanate, 2,5-dibutoxybenzene-1,4-diisocyanate, azobenzene-4,4'-diisocyanate, diphenylether-4,4'-diisocyanate, naphthalene-1,4-diisocyanate, naphthalene-1,5-diisocyanate, naphthalene-2,6-diisocyanate, naphthalene-2,7-diisocyanate, 3,3'-dimethyl-biphenyl-4,4'-diisocyanate, 3,3'-dimethoxybiphenyl-4,4'-diisocyanate, diphenylmethane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4'-triisocyanate, 4,4',4''-triisocyanate-2,5-dimethoxytriphenylamine, p-dimethylaminophenylisocyanate, and tris(4-phenylisocyanate) thiophosphate. If necessary, these isocyanate compounds may be used in the form of so-called block isocyanate which is an addition compound with a phenol, a lactam, an oxime or the like, or they may be used in the form of a diisocyanate and a dimer of diisocyanate such as a dimer of 1-methylebznene-2,4-diisocyanate and cyanurate which is a trimer. However, when all of the isocyanate groups are blocked, the effect of the present invention is not especially exhibited in some case.

One or more of these aromatic isocyanate compounds and one or more of alcoholic compounds are preliminarily dispersed in an aqueous solution containing a compound having dispersion aiding ability such as a water-soluble polymer, a polymeric emulsion, a surfactant or the like, and this preliminary dispersion is ground to an average particle size of 0.2-5.0μ, preferably 0.7-3.0μ by a dispersing machine such as a ball mill, a sand mill, a dye mill attritor, a colloid mill or the like to prepare a dispersion.

The imino compounds used in the present invention are compounds having at least one >C=NH and are represented by the formula

$\phi$ C=NH (wherein $\phi$ is an aromatic compound residue which can form a conjugated system with an adjacent C=N) and which are colorless or light colored and are solid at room temperature. Examples of the imino compounds are shown below and these may be used singly or in combination of two or more depending on the objects.

3-Iminoindoline-1-one, 3-imino-4,5,6,7-tetrachloroisoindoline-1-one, 3-imino-4,5,6,7-tetrabromoindolin-1-one, 3-imino-4,5,6,7-tetrafluoroisoindoline-1-one, 3-imino-5,6-dichloroisoindoline-1-one, 3-imino-4,5,7-trichloro-6-methoxy-isoindoline-1-one, 3-imino-4,5,7-trichloro-6-methylmercapto-isoindoline-1-one, 3-imino-6-nitroisoindoline-1-one, 3-imino-isoindoline-1-spiro-dioxolan, 1,1-dimethoxy-3-imino-isoindoline, 1,1-diethoxy-3-imino-4,5,6,7-tetrachloroisoindoline, 1-ethoxy-3-iminoisoindoline, 1,3-diiminoisoindoline, 1,3-diimino-4,5,6,7-tetrachloroindoline, 1,3-diimino-6-methoxyisoindoline, 1,3-diimino-6-cyanoisoindoline, 1,3-diimino-4,7-dithia-5,5,6,6-tetrahydroisoindoline, 7-amino-2,3-dimethyl-5-oxopyrrolo|3,4b|pyrazine, 7-amino-2,3-diphenyl-5-oxopyrrolo|3,4b|pyrazine, 1-iminonaphthalic acid imide, 1-iminodiphenic acid imide, 1-phenylimino-3-iminoisoindoline, 1-(3'-chlorophenylimino)-3-iminoisoindoline, 1-(2',5'-dichlorophenylimino)-3-iminoisoindoline, 1-(2',4'-5-trichlorophenylimino)-3-iminoisoindoline, 1-(2-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminioisoindoline, 1-(3'-N,N-dimethylamino-4'-methoxyphenylimino)-3-iminoisoindoline, 1-(2'-methoxy-5'-N-phenylcarbamoylphenylimino)-3-iminoisoindoline, 1-(2'-chloro-5'-trifluoromethylphenylimino)-3-iminoisoindoline, 1-(5',6'-dichlorobenzothiazolyl-2'-imino)-3-iminoisoindoline, 1-(6-methylbenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazolyl-3'-imino)-3-iminoisoindoline, 1-((naphthraquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinitrophenylhydrazone)-3-iminoisoindoline, 1-(indazolyl-3'-imino)-3-iminoisoindoline, 1-(indazolyl-3'-amino)-3-imino-4,5,6,7-tetrapromoisoindoline, 1-(indazolyl-3'-imino)-3-imino-4,5,6,7-tetrafluoroisoindoline, 1-(benzimidazolyl-2'-imino)-3-imino-4,7-dithiatetrahydroisoindoline, 1-(4',5'-dicyanoimidazolyl-2'-imino-3-imino-3,6-dimethyl-4,7-pyradiisoindoline, 1-(cyanobenzoylmethylene)-3-iminoisoindoline, 1-(cyanocarbonamidemethylene)-3-iminoisoindoline, 1-(cyanocarbomethoxymethylene)-3-iminoisoindoline, 1-(cyanocarboethoxymethyl(ene)-3-iminoisindoline, 1-(cyano-N-phenylcarbamoylmethylene)-3-iminoisoindoline, 1-[cyano-N-(3'-methylphenyl)carbamoylmethylene]-3-iminoisoindoline, 1-[cyano-N-(4'-chlorophenyl)carbamoylmethylene]-3-iminoisoindoline, 1-cyano-N-(4'-methoxyphenyl)-carbamoylmethlene]-3-iminoilo-4'-methylphenyl)-carbamoylmethylene]-3-iminoisoindoline, 1-(cyano-p-nitrophenylmethylene)-3-iminoisoindoline, 1-(dicyanomethylene)-3-iminoisoindoline, 1-(cyano-1',2',4'-triazolyl-(3')-carbamoylmethylene)-3-iminoisoindoline, 1-(cyanothiazoyl)-(2'-carbamoylmethylene)-3-iminoisoindoline, 1-(cyanobenzimidazolyl-(2')-carbamoylmethylene-3-iminoisoindoline, 1-(cyanobenzothiazolyl-(2')-carbamoylmethylene)-3-iminoisoindoline, 1-[cyanobenzimidazolyl-2')methylene]-3-iminoisoindoline, 1-[(cyanobenzimidazolyl-2')methylene]-3-imino-4,5,6,7-tetrachloroisoindoline, 1-[(cyanobenzimidazolyl-2')methylene]-3-imino-5-methoxyisoindoline, 1-[(cyanobenzimidazolyl-2')methylene]-3-imino-6-chloroisoindoline, 1-[(1'-phenyl-3'-methyl-5-oxo)-pyrazolidene-4']-3-iminoisoindoline, 1-[(cyanobenzimidazolyl-2')-methylene]-3-imino-4,7-dithiatetrahydroisoindoline, 1-[(cyanobenzimidazolyl-2')-methylene]-3-imino-5,6-dimethyl-4,7-pyradiisoindoline, 1-[(1'-methyl-3'-n-butyl)barbituric acid-5']-3-iminoisoindoline, 3-imino-1-sulfobenzoic acid imde, 3-imino-1-sulfo-6-chlorobenzoic acid imde, 3-imino-1-sulfo-5,6-dichlorobenzoic acid imide, 3-imino-1-sulfo-4,5,6,7-tetrachlorobenzoic acid imide, 3-imino-1-sulfo-4,5,6,7-tetrabromobenzoic acid imide, 3-imino-1-sulfo-4,5,6,7-tetrafluorobenzoic acid imide, 3-imino-1-sulfo-6-nitrobenzoic acid imide, 3-imino-1-sulfo-6-methoxybenzoic acid imide, 3-imino-1-sulfo-4,5,7-trichloro-6-methylmercaptobenzoic acid imide, 3-imino-1-sulfonaphthoic acid imide, 3-imino-1-sulfo-5-bromonaphthoic acid imde, and 3-imino-2-methyl-4,5,6,7-tetrachloroisoindoline-1-one.

As examples of the heat meltable compound having a melting point of 60°–180° C. used in the heat-sensitive recording layer of the present invention, mention may be made of benzyl p-benzyloxybenzoate, stearic acid amide, palmitic acid amide, N-methylolstearic acid amide, β-naphthylbenzyl ether, N-stearylurea, N,N'-distearylurea, phenyl β-naphthoate, phenyl 1-hydroxy-2-naphthoate, β-naphthol(p-methylbenzyl) ether, 1,4-dimethoxynaphthalene, 1-methoxy-4-benzyloxynaphthalene, N-stearoylurea, 4-benzylbiphenyl, 1,2-di-(m-methylphenoxy)ethane, 1-phenoxy-2-(4-chlorophenoxy)ethane, 1,4-butanediolphenyl ether, and dimethyl tetraphthalate.

The above heat meltable compound may be used singly or in admixture and are used preferably in an amount of 10–300%, by weight more preferably in an amount of 20–250% by weight based on the aromatic isocyanate compound in order to obtain sufficient heat responsiveness.

Furthermore, the heat-sensitive recording layer may further contain aniline derivatives having at least one amino group which are shown in PCT/JP81/00300 of the present applicant and which are more effective for inhibition of fogging of background area.

Examples of these compounds are methyl p-aminobenzoate, ethyl p-aminobenzoate, n-propyl p-aminobenzoate, iso-propyl p-aminobenzoate, butyl p-aminobenzoate, dodecyl p-aminobenzoate, benzyl p-aminobenzoate, o-aminobenzophenone, m-aminoacetophenone, p-aminoacetophenone, m-aminobenzamide, o-aminobenzamide, p-aminobenzamide, p-amino-N-methylbenzamide, 3-amino-4-methylbenzamide, 3-amino-4-methoxybenzamide, 3-amino-4-chlorobenzamide, p-(N-phenylcarbamoyl)aniline, p-[N-(4-chlorophenyl)carbamoyl]aniline, p[N-(4-aminophenyl)carbamoyl]aniline, 2-methoxy-5-(N-phenylcarbamoyl)aniline, 2-methoxy-5-[N-(2'-methyl-3'-chlorophenyl)carbamoyl]aniline, 2-methoxy-5-[N-(2'-chlorophenyl)carbamoyl]aniline, 5-acetylamino-2-methoxyaniline, 4-acetylaminoaniline, 4-(N-methyl-N-acetylamino)aniline, 2,5-diethoxy-4-(N-benzoylamino)aniline, 2,5-dimethoxy-4-(N-benzoylamino)aniline, 2-methoxy-4-[N-benzoylamino )-5-methylaniline, 4-sulfamoylaniline, 3-sulfamoylaniline, 2-(N-ethyl-N-phenylaminosulfonyl)aniline, 4-dimethylaminosulfonylaniline, 4-diethylaminosulfonylaniline, sulfathiazole, 4-aminodiphenylsulfone, 2-chloro-5-N-phenylsulfamoylaniline, 2-methoxy-5-N,N-diethylsulfamoylaniline, 2,5-dimethoxy-4-N-phenylsulfamoylaniline, 2-methoxy-5-benzylsulfonylaniline, 2-phenoxysulfonylaniline, 2-(2'-chlorophenoxy)sulfonylaniline, 3-anilinosulfonyl-4-methylaniline, bis[4-(m-aminophenoxy)phenyl]sulfone, bis[4-(p-aminophenoxy)phenyl]sulfone, bis[3-methyl-4-(p-aminophenoxy)phenylpsulfone, 3,3'-dimethoxy-4,4'-diaminobiphenyl, 3,3'-dimethyl-4,4'-diaminobiphenyl, 2,2'-dichloro-4,4'-diamino-5,5'-dimethoxybiphenyl, 2,2',5,5'-tetrachloro-4,4'-diaminobiphenyl, o-tolidinesulfone, 2,4'-diaminobiphenyl, 2,2'-diaminobiphenyl, 4,4'-diaminobiphenyl, 2,2'-dichloro-4,4'-diaminobiphenyl, 3,3'-dichloro-4,4'-diaminobiphenyl, 2,2'-dimethyl-4,4'-diaminobiphenyl, 4,4'-thiodianiline, 2,2'-dithiodianiline, 4,4'-dithiodianiline, 4,4'-diaminodiphenyl ether, 3,3'-diaminodiphenyl ether, 3,4'-diaminodiphenyl ether, 4,4'-diaminodiphenylmethane, 3,4'-diaminodiphenylmethane, bis(3-amino-4-chlorophenyl)sulfone, bis(3,4-diaminophenyl)sulfone, bis(4-aminophenyl)sulfone, bis(3-aminophenyl)sulfone, 3,4'-diaminodiphenylsulfone, 3,3'-diaminodiphenylmethane, 4,4'-ethylenedianiline, 4,4'-diamino-2,2'-dimethylbenzyl, 4,4'-diamino-3,3'-dichlorodiphenylmethane, 3,3'-diaminobenzophenone, 4,4'-diaminobenzophenone, 1,4-bis(4-aminophenoxy)benzene, 1,3-bis(4-aminophenoxy)benzene, 1,3-bis(3-aminophenoxy)benzene, 9,9-bis(4-aminophenyl)fluorene, 2,2-bis(4-aminophenoxyphenyl)propane, 4,4'-bis(4-aminophenoxy)diphenyl, 3,3',4,4'-tetraminodiphenyl ether, 3,3',4,4'-tetraminodiphenylsulfone, and 3,3',4,4'-tetraminobenzophenone.

An intermediate layer may be provided between the substrate and the heat-sensitive recording layer for improvement of color density. The heat-sensitive recording layer may comprise a single layer or multiple layers. In the case of the multiple layers, an intermediate layer may be provided between the respective layers. Furthermore, a protective layer may be provided on the heat-sensitive layer. This heat-sensitive recording layer can be formed by mixing aqueous dispersions obtained by grinding respective color forming components with binder and additives, and coating the mixture on a substrate. In this case, for example, each color forming component may be contained in one layer to form the multi-layer structure.

The binders used in the intermediate layer between the substrate and the heat-sensitive recording layer include, for example, latex binders such as styrene butadiene type, acrylonitrile butadiene type, and methyl acrylate-butadiene type latex binders, polyvinyl alcohol, modified polyvinyl alcohol, starches, casein, gelatin, and cellulosic binders. Preferred are those which have a gel content of 5–75% and these provide superior characteristics.

As the pigments, there may be used, for example, white pigments having a high oil absorption, preferably 60 ml/100 g of higher, such as calcium carbonate, kaolin, talc, calcined kaolin, silica, urea resin, and polystyrene resin.

There may be further added, if necessary, water retaining agents such as starch, cellulose derivatives, and acrylic resins and crosslinking agents such as inorganic peroxides, organic peroxides, phenolic resins, amino resins, aldehyde compounds, epoxy compounds, boric acid, phosphorus compounds, zirconium compounds, and silane compounds.

Coating amount of the heat-sensitive recording layer is about 1–20 g/m$^2$ and generally is 3–13 g/m$^2$.

Devices used for coating of the styrene butadiene latex layer, the magnetic recording layer, the protective layer, and the visible information recording layer such as the heat-sensitive recording layer include, for example, air knife coater, roll coater, rod coater, curtain coater, blade coater, and die coater. A size press and a gate roll coater can also be used especially for coating of the styrene-butadiene latex layer. Besides, printing methods such as offset printing and silk screen printing may also be employed.

Moreover, machine calender, supercalender, gloss calender, blushing and the like may be utilized for improvement of the surface smoothness of the coated layer.

As explained above, a magnetic recording sheet favorable in a variety of respects can be obtained by providing a magnetic recording layer comprising mainly a binder of which gel content is 5–75% and a ferromagnetic powder on a side of a substrate such as a fibrous substrate and a visible information recording layer on the other side of the substrate. The magnetic recording sheet is favorable in terms of less troubles during production steps with regards to occurrence of dry creases and toughening of coated layer surface and with regards to dimensional stability, in terms of improved runnability on recording and reading devices, and in terms of improved magnetic and visible information recording characteristics.

In addition, storage stability of the recorded images in heat-sensitive recording layer provided as the visible information recording layer can be enhanced by providing the heat-sensitive recording layer containing an aromatic isocyanate compound, an imino compound and a heat meltable substance having a melting point of 60°–180° C. In this case, if gel content in the binder of the magnetic recording layer is 5–75% as mentioned above, whiteness and storage stability of the recorded images can be further improved.

The present invention will be explained in more detail by the following examples. It should be understood that they are exemplary only, and should not be construed as limiting the invention. The "part" and "%" mean "part by weight" and "% by weight", respectively.

EXAMPLE 1

The following components were dispersed in a ball mill to prepare a coating composition for magnetic recording layer. That is, a styrene-butadiene latex having a gel content of 50% was used.

| | |
|---|---|
| Ba-ferrite (coercive force: 2700 Oe) | 100 parts |
| Styrene-butadiene latex (L-1365 of Asahi Kasei Kogyo K.K., gel content 50%) | 30 parts |
| Water | 200 parts |

The above coating composition for magnetic recording layer was coated in an amount of 30 g/m$^2$ (solid weight) on one side of a base paper having a basis weight of 160 g/m$^2$, subjected to orientation of magnetic field and then dried at 105° C. This was called magnetic layer coated paper A.

A coating composition for heat-sensitive recording layer was prepared in the following manner.

| | |
|---|---|
| Liquid A: | |
| 3-Dibutylamino-6-methyl-7-anilinofluoran | 12 parts |
| 10% Aqueous polyvinyl alcohol solution | 18 parts (1.8 parts as solid content) |
| Water | 30 parts |
| Liquid B: | |
| 4,4'-Isopropylidenediphenol | 40 parts |
| p-Benzylbiphenyl | 40 parts |
| Zinc stearate | 20 parts |
| 10% Aqueous polyvinyl alcohol solution | 50 parts (5 parts as solid content) |
| Water | 100 parts |

Liquid A and liquid B were separately ground and dispersed to an average particle size of about 2μ by a sand grinder and a coating composition for heat-sensitive recording layer was prepared as follows.

| | |
|---|---|
| Calcium carbonate (Brt-15 of Shiraishi Kogyo Co.) | 8 parts |
| Liquid A | 12 parts |
| 10% Aqueous polyvinyl alcohol solution | 40 parts (4 parts as solid) |
| Liquid B | 30 parts |
| Water | 100 parts |

This coating composition for heat-sensitive recording layer was coated in an amount of 5 g/m$^2$ on the side of the above magnetic layer-coated paper A which is opposite to the magnetic layer side, namely, on which the magnetic layer was not present, then was dried at 50° C., and subjected to supercalendering to obtain a magnetic recording sheet of Example 1 of the present invention.

EXAMPLE 2

An aqueous polyvinyl alcohol solution was coated in an amount of 3 g/m$^2$ (solid content) on the magnetic layer of the magnetic layer coated paper A of Example 1, was dried at 105° C. and then, a heat-sensitive recording layer was provided in the same manner as in Example 1, dried at 50° C. and then, supercalendered to obtain a magnetic recording sheet of Example 2.

EXAMPLE 3

After the heat-sensitive recording layer was provided in Example 2, an aqueous polyvinyl alcohol solution was coated in an amount of 3 g/m$^2$ (solid content) on the heat-sensitive recording layer, was dried at 50° C. and was supercalendered to obtain a magnetic recording sheet of Example 3.

EXAMPLE 4

A magnetic recording sheet was obtained in the same manner as in Example 1 except that a styrene-butadiene latex having a gel content of 8% (P-8702 of Sumitomo Naugatak Co.) was used in place of the latex having the gel content of 50% in the coating composition for magnetic recording layer.

EXAMPLE 5

A magnetic recording sheet was obtained in the same manner as in Example 1 except that a styrene butadiene latex having a gel content of 70% (L-1235 of Asahi Kasei Kogyo Co.) was used in place of the latex having the gel content of 50% in the coating composition for magnetic recording layer.

COMPARATIVE EXAMPLE 1

A magnetic recording sheet was obtained in the same manner as in Example 1 except that a styrene butadiene latex having a gel content of 85% (SNX-4270 of Sumitomo Nogatac Co.) was used in place of the latex having the gel content of 50% in the coating composition for magnetic recording layer.

COMPARATIVE EXAMPLE 2

A magnetic recording sheet was obtained in the same manner as in Example 3 except that in place of the SBR having the gel content of 50% a styrene-butadiene latex having gel content of 85% (Sumitomo Naugatak SNX-4270) was used in the coating composition for magnetic recording layer.

EXAMPLE 6

A heat transfer receiving layer of the following composition was coated in an amount of 10 g/m$^2$ (solid content) on the side of the magnetic layer coated paper A used in Example 1 on which the magnetic layer was not coated and the coated layer was dried at 105° C.

| | |
|---|---|
| Synthetic silica | 100 parts |
| Sodium pyrophosphate | 0.3 part |
| Polyvinyl alcohol | 20 parts |
| Ethylene-vinyl acetate latex | 20 parts |
| Water | 300 parts |

Subsequently, the layer was supercalendered to obtain a magnetic recording sheet.

EXAMPLE 7

In place of the heat-sensitive recording layer in Example 2, the heat transfer receiving layer of Example 6 was coated in an amount of 10 g/m$^2$ (solid), was dried at 105° C., and then was supercalendered to obtain a magnetic recording sheet.

EXAMPLE 8

A magnetic recording sheet was obtained in the same manner as in Example 6 except that a styrene butadiene latex having a gel content of 70% (L-1235 of Asahi Kasei Kogyo Co. ) was used in place of the latex having the gel content of 50% in the coating composition for magnetic recording layer.

COMPARATIVE EXAMPLE 3

A magnetic recording sheet was obtained in the same manner as in Example 6 except that a styrene-butadiene latex having a gel content of 85% (SNX-4270 of Sumitomo Naugatak Co.) was used in place of the latex having the gel content of 50% in the coating composition for magnetic recording layer.

EXAMPLE 9

An ink jet receiving layer of the following composition was coated in an amount of 10 g/m² (solid content) on the side of the magnetic layer coated paper A used in Example 1 on which the magnetic layer was not coated and the coat was dried at 105° C. and supercalendered to obtain a magnetic recording sheet.

| Synthetic silica | 100 parts |
| --- | --- |
| Polyvinyl alcohol (polymerization degree: 1700, completely saponified type) | 50 parts |
| Polyacrylamide (molecular weight: 200,000) | 20 parts |
| Water | 300 parts |

EXAMPLE 10

In place of the heat-sensitive recording layer in Example 2, the heat transfer receiving layer of Example 9 was coated in an amount of 10 g/m² (solid content), was dried at 105° C. and was supercalendered to obtain a magnetic recording sheet.

EXAMPLE 11

A magnetic recording sheet was obtained in the same manner as in Example 9 except that a styrene-butadiene latex having a gel content of 70% (L-1235 of Asahi Kasei Kogyo Co. ) was used in place of the latex having the gel content of 50% in the coating composition for magnetic recording layer.

COMPARATIVE EXAMPLE 4

A magnetic recording sheet was obtained in the same manner as in Example 9 except that a styrene-butadiene latex having a gel content of 85% (SNX-4270 of Sumitomo Nogatac Co.) was used in place of the latex having the gel content of 50% in the coating composition for magnetic recording layer.

EXAMPLE 12

A printing ink receiving layer of the following composition was coated in an amount of 10 g/m² (solid content) on the side of the magnetic layer coated paper A used in Example 1 on which the magnetic layer was not coated and the coat was dried at 105° C. and supercalendered to obtain a magnetic recording sheet.

| Kaolin (Ultracoat of Engelherd Co.) | 100 parts |
| --- | --- |
| Acrylic dispersant (Alon T-40 of Toagosei Chemical Industry Co., Ltd.) | 0.5 part |
| Styrene-butadiene latex (JIS-0691D of Japan Synthetic Rubber Co., Ltd.) | 20 parts |
| Phosphoric acid esterified starch | 10 parts |
| Water | 100 parts |

EXAMPLE 13

In place of the heat-sensitive recording layer in Example 2, the printing ink receiving layer of Example 12 was coated in an amount of 10 g/m² (solid content), was dried at 105° C. and then was supercalendered to obtain a magnetic recording sheet.

EXAMPLE 14

A magnetic recording sheet was obtained in the same manner as in Example 12 except that a styrene-butadiene latex having a gel content of 70% (L-1235 of Asahi Kasei Kogyo Co.) was used in place of the latex having the gel content of 50% in the coating composition for magnetic recording layer.

COMPARATIVE EXAMPLE 5

A magnetic recording sheet was obtained in the same manner as in Example 12 except that a styrene-butadiene latex having a gel content of 85% (SNX-4270 of Sumitomo Nogatac Co.) was used in place of the latex having the gel content of 50% in the coating composition for magnetic recording layer.

EXAMPLE 15

A magnetic recording sheet was obtained in the same manner as in Example 1 except that ammonium nitrate casein having a gel content of 55% was used in a coating composition for magnetic recording layer in place of the styrene-butadiene latex having a gel content of 50%.

EXAMPLE 16

A magnetic recording sheet was obtained in the same manner as in Example 1 except that an urethane resin having a gel content of 70% (UD2017 of Mitsui Toatsu Chemicals, Inc.) was used in place of the styrene-butadiene latex having the gel content of 50% in the coating composition for magnetic recording layer.

COMPARATIVE EXAMPLE 6

A magnetic recording sheet was obtained in the same manner as in Example 1 except that an urethane resin having a gel content of 83% was used in place of the styrene-butadiene latex having the gel content of 50% in the coating composition for magnetic recording layer.

EXAMPLE 17

A coating composition for magnetic recording layer was prepared by dispersing the following components in a ball mill.

| Be-ferrite (coercive force: 2700 Oe) | 100 parts |
| --- | --- |
| Styrene-butadiene latex (T2028 of Japan Synthetic Rubber Co., Ltd., gel content: 28%) | 30 parts |
| Water | 200 parts |

The above coating composition for magnetic recording layer was coated in an amount of 30 g/m² (solid content) on one side of a paper having a basis weight of 160 g/m², was subjected to orientation of magnetic field and then was dried at 105° C. This was called magnetic layer coated paper A.

A coating composition for an intermediate layer for heat-sensitive recording layer was prepared by dispersing the following components.

| | |
|---|---|
| Calcined kaolin (Ancilex of Engelherd Co.) | 100 parts |
| Acrylic dispersant (Alon F40 of Toagosei Chemical Industry Co., Ltd.) | 0.5 part |
| Styrene-butadiene latex (JSR0693 of Japan Synthetic Rubber Co., Ltd., gel content: 65%) | 20 parts |
| Phosphoric acid esterified starch(MS6400 of Nippon Shokuhin Kako Co.) | 10 parts |
| Water | 100 parts |

The above coating composition was coated in an amount of 10 g/m² on another side of the magnetic layer coated paper A, namely, on the side on which the magnetic layer was not coated and the coat was dried at 105° C. to obtain a paper having an undercoat for heat-sensitive recording layer.

A coating composition for heat-sensitive recording layer was prepared in the following manner.

| | |
|---|---|
| 1,3'-Diimino-4,5,6,7-tetrachloro-isoindoline | 15 parts |
| 4,4',4''-Triisocyanato-2,5-dimethoxy triphenylamine | 10 parts |
| Stearic acid amide (m.p. 109° C.) | 5 parts |
| 2-Methoxy-5-N,N-diethylsulfamoyl-aniline | 0.5 part |
| Polyvinyl alcohol | 20 parts |

The above components other than poluvinyl alcohol were separately dispersed and then mixed with polyvinyl alcohol. Furthermore, 30 parts of calcium carbonate and 10 parts of zinc stearate were added to the mixture, followed by stirring to obtain the coating composition for heat-sensitive recording layer. This coating composition was coated in an amount of 5 g/m² (solid content) on the intermediate layer of the paper A having the undercoat for heat-sensitive recording layer, was dried at 50° C., and then supercalendered to obtain a heat sensitive recording type magnetic recording sheet.

EXAMPLE 18

A heat sensitive recording type magnetic recording sheet was obtained in the same manner as in Example 17 except that the coating composition for heat-sensitive recording layer was coated directly without the intermediate layer on the side of the magnetic layer coated paper A on which the magnetic layer was not present.

EXAMPLE 19

A heat-sensitive recording type magnetic recording sheet was obtained in the same manner as in Example 17 except that 2-methoxy-5-N,N-diethylsulfamoylaniline in the coating composition for heat-sensitive recording layer was omitted.

EXAMPLE 20

A heat-sensitive recording type magnetic recording sheet was obtained in the same manner as in Example 17 except that a styrene-butadiene latex having a gel content of 70% (L-1235 of Asahi Kasei Kogyo Co.) was used in place of the styrene-butadiene latex (T2028) in the magnetic recording layer.

EXAMPLE 21

A heat-sensitive recording type magnetic recording sheet was obtained in the same manner as in Example 17 except that a styrene-butadiene latex having a gel content of 85% (SUX-4270 of Sumitomo Nogatac Co.) was used in place of the styrene-butadiene latex (T2028) in the magnetic recording layer.

EXAMPLE 22

A heat-sensitive recording type magnetic recording sheet was obtained in the same manner as in Example 17 except that the following coating composition for the magnetic recording layer in Example 17 was used.

| | |
|---|---|
| Ba-ferrite (coercive force: 2700 Oe) | 100 parts |
| Polyester resin | 40 parts |
| Lecithin | 2 parts |
| Toluene + methyl ethyl ketone | 350 parts |

COMPARATIVE EXAMPLE 7

A heat-sensitive recording type magnetic recording sheet was obtained in the same manner as in Example 17 except that stearic acid amide in the heat-sensitive recording layer was omitted.

COMPARATIVE EXAMPLE 8

A heat-sensitive recording type magnetic recording sheet was obtained in the same manner as in Example 17 except that a coating composition prepared from the following components was used in place of the coating composition for the heat-sensitive recording layer in Example 17.

| | |
|---|---|
| 3-N-methyl-N-cyclohexylamino-6-methyl-7-anilinofluoran | 10 parts |
| Bisphenol A | 20 parts |
| Calcium carbonate | 20 parts |
| Polyvinyl alcohol | 10 parts |
| Water | 200 parts |

COMPARATIVE EXAMPLE 9

A heat-sensitive recording type magnetic recording sheet was obtained in the same manner as in Example 22 except that the coating composition for heat-sensitive recording layer used in Comparative Example 8 was used in place of the coating composition for the heat-sensitive recording layer of Example 22.

The magnetic recording sheets obtained in the above-examples and comparative examples were evaluated by the following methods and the results are shown in Tables 1 and 2.

1. Squareness:

Saturation magnetic flux density Bm and residual magnetic flux density Br in orientation direction of the magnetic recording layer were measured using B-H curve tracer and the ratio Br/Bm was taken as the squareness. The larger value means that dispersibility of the magnetic powders is superior.

2. Variability of magnetic output:

Variability of the output was measured by a magnetism analyzer for a prepaid card (210BPI writing FM system). This is shown by % and the smaller value is the better.

3. Record density on the heat-sensitive recording layer:

The heat-sensitive recording layer surface was brought contact with a heat gradient meter (manufactured by Toyo Seiki Co.) heated to 120° C. at contact pressure of 1 kg/cm² for 3 seconds to effect coloring of the layer surface, and intensity of the coloring was measured by Macbeth densitometer. The greater the value means the higher color developability.

4. Image quality on the heat transfer receiving layer:

A heat transfer ink was transferred from an ink sheet to the heat transfer receiving layer of the magnetic recording sheet by a commercially available heat transfer printer and printability was evaluated by continuity of thin rules printed. The results are shown by the following three grades.
  o: Excellent
  Δ: Practically acceptable
  x: Inferior 5. Image quality on the ink jet receiving layer:

The ink jet receiving layer of the magnetic recording sheet was printed by a commercially available ink jet printer (A-1210 of Canon. Inc.) using a black ink and quality of the resulting record was visually evaluated according to the following criteria.
  o: Excellent
  Δ: Practically acceptable
  x: Inferior 6. Image quality of the printing ink receiving layer:

The printing ink receiving layer of the magnetic recording sheet was printed with black ink by a commercially available offset press and quality of the printed image was visually evaluated and the results are shown by the following criteria.
  o: Excellent
  Δ: Practically acceptable
  x: Inferior 7. Roughness of the surface:

Roughness of the magnetic recording layer before supercalendering and the visible image recording layer was evaluated and the results are shown by the following criteria.
  o: Substantially no surface roughness is observed.
    : Some roughness is observed.
  Δ: Appreciable roughness is observed.
  x: Prevailing roughness is observed.

8. Whiteness of background of the heat-sensitive recording layer:

Density of unrecorded portion of the heat-sensitive recording layer of Examples 17–22 and Comparative Examples 7–9 was measured by Macbeth RD918 densitometer. The results are shown in Table 2. The smaller value means the higher whiteness.

9. Color density of heat-sensitive recording layer (heat responsiveness):

Recording was carried out on the heat-sensitive recording layer of Examples 17–22 and Comparative Examples 7–9 by a thermal facsimile printing tester tester, where power input level was kept constant at 22 volts but pulse duration was shifted to two levels, 1.0 msec and 1.4 msec. The resulting image density was measured by a Macbeth RD 918 densitomer; the data are shown in Table 2. The larger value means better responsiveness.

10. Resistance of records formed on the heat-sensitive recording layer to a plasticizer (storage stability of recorded image):

Recording was carried out similarly as in Test 9 above, except that pulse duration was kept constant at 1.4 msec, on the heat-sensitive recording layer of Examples 17–22 and Comparative Examples 7–9. On the resulting prints, a polyvinylchloride sheet was laid and pressed at a load of 300 g/m² and allowed for 24 hours at 40° C. Image density of record on the prints, before and after the test, were measured in the same manner as in Test 9 and image retention rate was calculated from the following formula:

$$\text{Image retention ratio} = \frac{\text{Image density after test}}{\text{Image density before test}} \times 100(\%)$$

TABLE 1

| | Example | | | | | Comparative Example | | Example | | |
|---|---|---|---|---|---|---|---|---|---|---|
| | 1 | 2 | 3 | 4 | 5 | 1 | 2 | 6 | 7 | 8 |
| Gel content in binder of magnetic recording layer (%) | 50 | 50 | 50 | 8 | 70 | 85 | 85 | 50 | 50 | 70 |
| Presence of protective layer of magnetic recording layer | No | Yes | Yes | No | No | No | Yes | No | Yes | No |
| Kind of visible information recording layer | A | A | A | A | A | A | A | B | B | B |
| Presence or protective layer for visible information recording layer | No | No | Yes | No | No | No | Yes | No | No | No |
| Squareness (Br/Bm) | 0.76 | 0.74 | 0.75 | 0.76 | 0.74 | 0.72 | 0.73 | 0.75 | 0.76 | 0.75 |
| Variability of output of magnetic layer (%) | 20 | 18 | 19 | 18 | 19 | 27 | 25 | 19 | 21 | 18 |
| Recording density of heat-sensitive recording layer | 1.26 | 1.27 | 1.25 | 1.26 | 1.27 | 1.23 | 1.24 | | | |
| Image quality of heat-transfer receiving layer | | | | | | | | o | o | o |
| Image quality of jet receiving layer | | | | | | | | | | |
| Image quality of printing ink | | | | | | | | | | |

TABLE 1-continued

| | | | | | | | | | |
|---|---|---|---|---|---|---|---|---|---|
| recording layer Irregularity of the surface | ◯ | ◯ | | ◯ | ◯ | △ | X | ◯ | ◯ | ◯ |

| | Comparative Example 3 | Example 9 | Example 10 | Example 11 | Comparative Example 4 | Example 12 | Example 13 | Example 14 | Comparative Example 5 |
|---|---|---|---|---|---|---|---|---|---|
| Gel content in binder of magnetic recording layer (%) | 85 | 50 | 50 | 70 | 85 | 50 | 50 | 70 | 85 |
| Presence of protective layer of magnetic recording layer | No | No | Yes | No | No | No | Yes | No | No |
| Kind of visible information recording layer | B | C | C | C | C | D | D | D | D |
| Presence or protective layer for visible information recording layer | No | No | No | No | No | No | No | No | No |
| Squareness (Br/Bm) | 0.74 | 0.76 | 0.75 | 0.74 | 0.73 | 0.74 | 0.76 | 0.75 | 0.74 |
| Variability of output of magnetic layer (%) | 24 | 19 | 18 | 18 | 24 | 19 | 18 | 18 | 25 |
| Recording density of heat-sensitive recording layer | | | | | | | | | |
| Image quality of heat-transfer receiving layer | X | | | | | | | | |
| Image quality of jet receiving layer | | ◯ | ◯ | ◯ | △ | | | | |
| Image quality of printing ink recording layer | | | | | | ◯ | ◯ | ◯ | X |
| Irregularity of the surface | △ | ◯ | ◯ | ◯ | △ | ◯ | ◯ | ◯ | △ |

| | | Example 15 | Example 16 | Comparative Example 6 |
|---|---|---|---|---|
| | Gel content in binder of magnetic recording layer (%) | 55 | 70 | 83 |
| | Presence of protective layer of magnetic recording layer | No | No | No |
| | Kind of visible information recording layer | A | A | A |
| | Presence or protective layer for visible information recording layer | No | No | No |
| | Squareness (Br/Bm) | 0.73 | 0.75 | 0.74 |
| | Variability of output of magnetic layer (%) | 20 | 19 | 23 |
| | Recording density of heat-sensitive recording layer | 1.25 | 1.26 | 1.23 |
| | Image quality of heat-transfer receiving layer | | | |
| | Image quality of jet receiving layer | | | |
| | Image quality of printing ink recording layer | | | |
| | Irregularity of the surface | ◯ | ◯ | △ |

*A: Heat-sensitive recording layer;
B: Heat transfer receiving layer;
C: Ink jet receiving layer;
D: Printing ink receiving layer.

TABLE 2

|  |  | Variability of output of magnetic recording layer (%) | Heat-sensitive recording layer | | | |
|---|---|---|---|---|---|---|
|  |  |  | Whitenessc of background | Heat responsiveness | | Storage stability of image |
|  |  |  |  | 1.0 msec | 1.4 msec |  |
| Example | 17 | 18 | 0.05 | 0.80 | 1.15 | 100% |
|  | 18 | 16 | 0.05 | 0.70 | 1.05 | 100% |
|  | 19 | 18 | 0.07 | 0.82 | 1.16 | 100% |
|  | 20 | 21 | 0.05 | 0.80 | 1.14 | 100% |
|  | 21 | 24 | 0.07 | 0.79 | 1.13 | 100% |
|  | 22 | 14 | 0.10 | 0.83 | 1.17 | 101% |
| Comparative Example | 7 | 18 | 0.05 | 0.68 | 0.96 | 100% |
|  | 8 | 18 | 0.06 | 0.96 | 1.21 | 60% |
|  | 9 | 14 | 0.28 | 1.00 | 1.21 | 64% |

It is clear that the magnetic recording sheet of the present invention is superior in production operability, recording characteristics, and visible information recording characteristics. It is also clear that the magnetic recording sheet is superior in whiteness of its heat-sensitive recording layer and image storage stability.

What is claimed is:

1. A magnetic recording sheet comprising:
   a fibrous substrate,
   a magnetic recording layer which comprises a binder having a gel content of 5-75 wt % and ferromagnetic powders and is provided on one side of the substrate, and
   a visible information recording layer which comprises at least one binder selected from the group consisting of a synthetic resin binder and a natural resin binder and is provided on another side of the substrate, said visible recording layer being applied to the substrate in amounts ranging from about 1 g/m$^2$ to about 30 g/m$^2$.

2. A magnetic recording sheet according to claim 1, wherein a protective layer is provided on the magnetic recording layer.

3. A magnetic recording sheet according to claim 1, wherein the visible information recording layer is a heat-sensitive recording layer.

4. A magnetic recording sheet according to claim 3, wherein a protective layer is provided on the heat-sensitive recording layer.

5. A magnetic recording sheet according to claim 1, wherein the visible information recording layer is a heat transfer receiving layer.

6. A magnetic recording sheet according to claim 1, wherein the visible information recording layer is an ink jet receiving layer.

7. A magnetic recording sheet according to claim 1, wherein the visible information recording layer is a printing ink receiving layer.

8. A magnetic recording sheet comprising a substrate, a magnetic recording layer which comprises a binder and ferromagnetic powders and is provided on one side of the substrate, said binder having a gel content of 5-75 wt %, and a heat-sensitive recording layer which comprises an aromatic isocyanate compound, an amino compound, and a binder and contains a heat meltable substance having a melting point of 60°-180° C. and is provided on the other side of the substrate.

9. A magnetic recording sheet according to claim 8, wherein the heat-sensitive recording layer additionally contains an aniline derivative having at least one amino group.

10. A magnetic recording sheet according to claim 8, wherein an intermediate layer comprising a pigment and a binder is provided between the substrate and the heat-sensitive recording layer.

11. A magnetic recording sheet comprising:
   a fibrous substrate, said substrate having a first and a second surface;
   a magnetic recording layer which comprises a binder having a gel content of 5-75 wt % and ferromagnetic powders, said magnetic recording layer being provided on said first surface of said substrate;
   a first protective layer, said first protective layer being provided on said magnetic recording layer;
   a heat-sensitive visible information recording layer, said visible recording layer comprising an aromatic isocyanate compound, an amino compound, and a binder and contains a heat meltable substance having a melting point of 60°-180° C., said binder being at least one binder selected from the group consisting of a synthetic binder and a natural resin binder, said visible recording layer being provided on said second surface of said substrate, said visible recording layer being applied to the substrate in amounts ranging from about 1 g/m$^2$ to about 30 g/m$^2$; and
   a second protective layer, said second protective layer comprising a hydrophilic resin, said second protective layer being provided on said visible recording layer.

* * * * *